United States Patent Office 3,510,118
Patented May 5, 1970

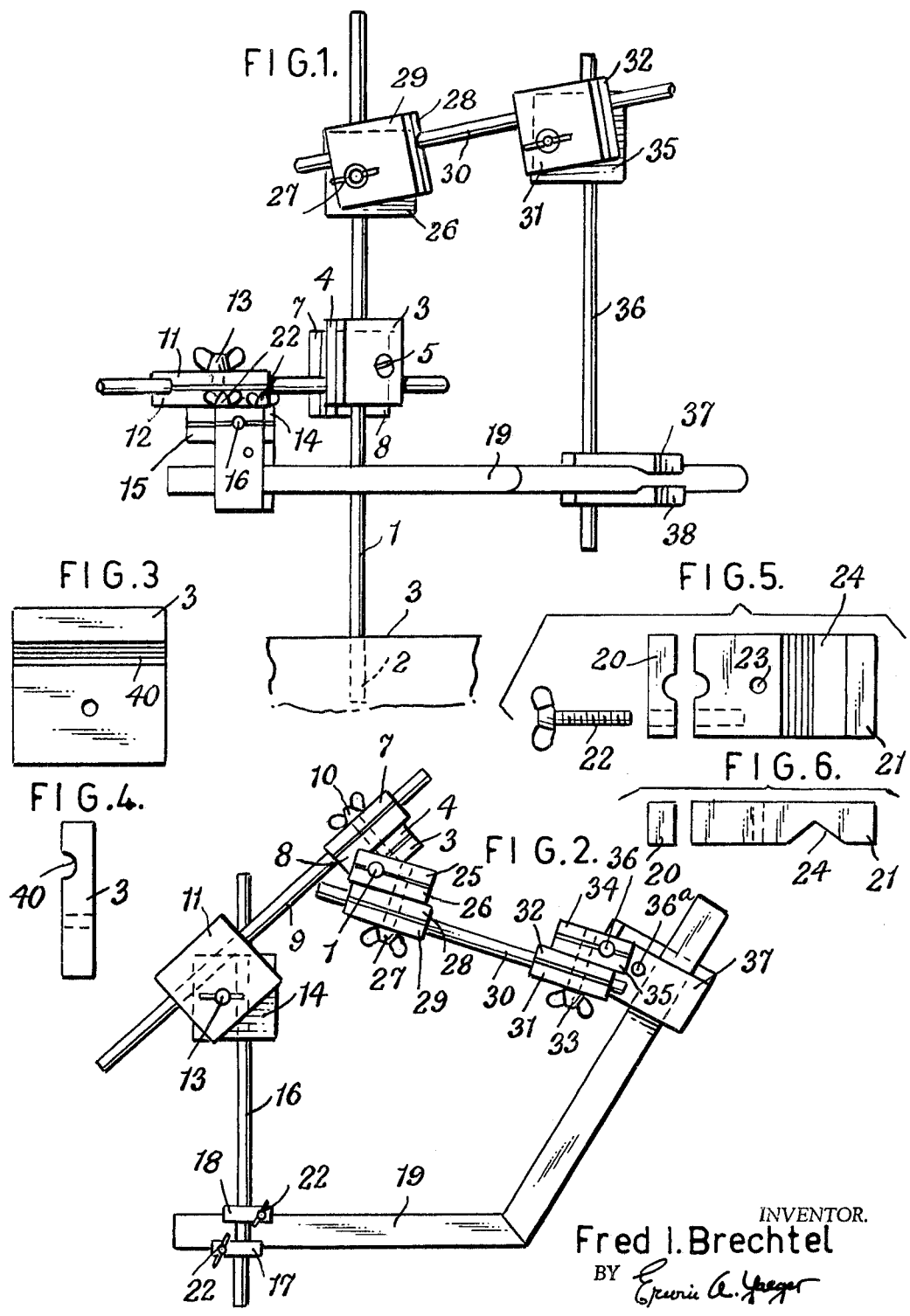

3,510,118
WORK HOLDER OR JIG
Fred I. Brechtel, 803 NW. 1st St.,
Fort Lauderdale, Fla. 33311
Filed Jan. 8, 1968, Ser. No. 696,265
Int. Cl. B25b 5/14
U.S. Cl. 269—104          1 Claim

ABSTRACT OF THE DISCLOSURE

A jig or clamp for holding articles or workpieces consisting of a supporting rod or post upon which a plurality of clamps are adjustably mounted. Each of the clamps is provided with a projecting rod that is adjustable through the clamp, the rod carrying a clamp through which a second rod is longitudinally adjustable. Workpiece clamping jaws are carried by the second rod. One of the clamps carried by the supporting post has a third rod that is slidably adjustable through it and the latter rod carries a clamp adjacent one end and the latter clamp carries a fourth rod on which workpiece engaging jaws are carried. There are pivotal adjustments between portions of the several clamps so that very substantial adjustment between the rods and the various other parts of the structure is possible and the secure engagement and holding of workpieces of various shapes and sizes is attained.

---

The present invention relates to a jig or holder for workpieces and is particularly useful for holding parts for welding, for repair or for many other purposes.

Since the shape and size of the workpieces differ greatly, it is desirable that the holder shall be extremely flexible in its adjustment and usage and shall be capable of securely engaging and holding the many different types of articles to be welded, repaired or otherwise treated.

It is therefore a primary object of the present invention to provide a jig, holder or clamp which has its parts so articulatively coupled together and is so capable of adjustment that its parts can be readily arranged in the required relationship and position to enable the device to hold and securely retain many different types of work in the required position for treatment.

With these and other objects to be hereinafter set forth in view, I have devised the arrangement of parts to be described and more particularly pointed out in the claim appended hereto.

In the accompanying drawing, wherein an illustrative embodiment of the invention is disclosed, FIG. 1 is a front elevational view of a jig or holder constructed according to the present invention;

FIG. 2 is a top plan view of the same;

FIG. 3 is a view of the inside face of one of the rod-clamping plates;

FIG. 4 is a side view of the same;

FIG. 5 shows the elements which form one of the work-holding jaws; and

FIG. 6 is an end view of the same.

Referring to the drawing, 1 indicates a vertical rod or supporting post having one end 2 mounted in a base 3 which may be the top of a work bench or other suitable support. The post 1 may be rotatively or fixedly mounted in the support 2 as desired according to requirements.

The supporting rod or post 1 is clamped between a pair of plates 3 and 4 by means of a bolt 5 and said plates, constituting a clamp on the rod 1, are adjustable along the length of the rod 1 as required. Secured to the plates 3 and 4 is a pair of plates 7 and 8 which clampingly engage a first rod 9 and which rod 9 is longitudinally adjustable in the plates 7 and 8. A wing-bolt 10 causes the plates 7 and 8 to grippingly engage the rod 9 between them at any selected position on the rod 9.

The rod 9 is also engaged between horizontal plates 11 and 12 through which wing-bolt 13 passes to cause the plates 11 and 12 to clamp the rod 9 between them at any selected point along the length of the rod 9. The wing-bolt 13 also acts to cause a pair of plates indicated respectively at 14 and 15 to clamp a second rod 16 between them.

At an end remote from the plates 14 and 15, the rod 16 carries work-clamping jaws indicated respectively at 17 and 18 which are employed for the purposes of gripping a workpiece, an example of the same being shown at 19. Each of the jaws 17 and 18 (and one of said jaws is shown in FIGS. 5 and 6) is composed of the two parts indicated respectively at 20 and 21, which parts are held clamped about the rod 16 by wing-bolts 22. To exert additional clamping force, if required, on the workpiece, a clamping screw or bolt can be inserted through the openings 23 in the jaws and the jaws can also be grooved as shown at 24, for example to securely hold the workpiece 19.

Near its upper end, the supporting rod or post 1 is engaged between plates 25 and 26, which plates are held in the required clamping position on the rod 1 by means of a wing-bolt 27 which also attaches the plates 25 and 26 to another pair of plates 28 and 29, which latter plates grip a third rod 30 between them. On said rod 30, at a location remote from the plates 28 and 29, are clamping plates 31 and 32 held in their required clamping position by a wing-nut 33. Said wing-nut 33 passes through plates 34 and 35 which clampingly engage the fourth rod shown at 36.

Adjustable along the length of the rod 36 are workpiece jaws 37 and 38, these jaws being clampingly held in engagement with the workpiece 19 by means of a clamping screw 39.

The several clamping plates which engage with the rods 1, 9, 30 and 36 between them are grooved as indicated at 40 in FIGS. 3 and 4 to enable these plates to fit the cylindrical shape of the rods on which they are clampingly fitted.

The jig or holder described is one of great flexibility and adaptability to all kinds of workpieces. The rod 9 is vertically adjustable on the supporting rod or post 1 by means of the clamp 3, 4. Rod 9 is slidably adjustable through clamp 7, 8 which clamp is pivotally adjustable around rod 1. Rod 9 is slidably adjustable through clamp 11, 12. Clamp 14, 15 is pivotally adjustable on wing-bolt 13 and the rod 16 is slidably adjustable in clamp 14, 15. The jaws 17 and 18 are slidably adjustable along the rod 16 and can be pivotally adjusted on the rod 16.

The rod 30 is slidably adjustable through clamp 28, 29, while plates 25 and 26 are adjustable along the length of the rod 1. Pivotal adjustment of the rod 30 is had through the wing-nut 27. Clamp 34, 35 is adjustable on the rod 36; wing-nut 33 establishes a pivotal connection between the clamp 31, 32 and clamp 34, 35. The jaws 37, 37 are adjustable on the rod 36. The numerous parts which make up the described structure are so articulatively connected together that a multitude of positions for the work-clamping jaws are possible. It will therefore be apparent that workpieces of various shapes, sizes or forms may be held by the simple adjustment of the parts of the holder and in positions required for the specific performance of operations on them.

Having thus described an embodiment of the invention, it is obvious that the same is not to be restricted thereto, but is broad enough to cover all structures coming within the scope of the annexed claim.

What I claim is:

1. A jig or holder for workpieces comprising, a base, a vertical post mounted in the base and rising therefrom, an upper clamp slidably adjustable on the post and fixable at various selected positions thereon, said clamp having a pivotally adjustable portion, a first rod extending through and clampingly held in said pivotally adjustable portion, a clamp carried on the first rod and slidably adjustable thereon, said clamp having a pivotal part through which a second rod is slidably adjustable to position it at any selected location on the second rod, a pair of jaws slidably adjustable on the second rod for the embracement of a workpiece between them, the post having a lower clamp slidably adjustable on it below the upper clamp, the lower clamp having a pivotal portion embracing a third rod that is slidably adjustable through the lower clamp, a clamp slidably adjustable on the third rod, the latter clamp including a pivoted rod holder through which a fourth rod is slidably adjustable, a pair of workpiece-clamping jaws slidably and independently adjustable on the fourth rod, each of the latter jaws having means for enabling it to grip the fourth rod to clampingly hold a workpiece, the pair of jaws on the second rod being arranged to engage a workpiece at two opposite sides and the jaws on the fourth rod being arranged to engage the workpiece at two remaining sides of the same.

References Cited

UNITED STATES PATENTS

| | | | |
|---|---|---|---|
| 2,669,958 | 2/1954 | Sweeney | 269—45 |
| 1,490,489 | 4/1924 | Seavey | 287—14 |
| 2,630,342 | 3/1953 | Gilmont | 287—14 |

FOREIGN PATENTS 353,887  6/1961  Switzerland.

ROBERT C. RIORDON, Primary Examiner

D. D. EVENSON, Assistant Examiner